Oct. 25, 1960

D. A. CUSANO

PROJECTION COLOR TELEVISION WITH PHOTOELECTROLUMINESCENT SCREEN

Filed Aug. 16, 1956

2,957,940

Inventor:
Dominic A. Cusano,
by Paul A. Frank
His Attorney.

United States Patent Office 2,957,940

Patented Oct. 25, 1960

2,957,940

PROJECTION COLOR TELEVISION WITH PHOTO-ELECTROLUMINESCENT SCREEN

Dominic A. Cusano, Schenectady, N.Y., assignor to General Electric Company, a corporation of New York Filed Aug. 16, 1956, Ser. No. 604,422

10 Claims. (Cl. 178—5.4)

Figures 1, 2, 3, 4:
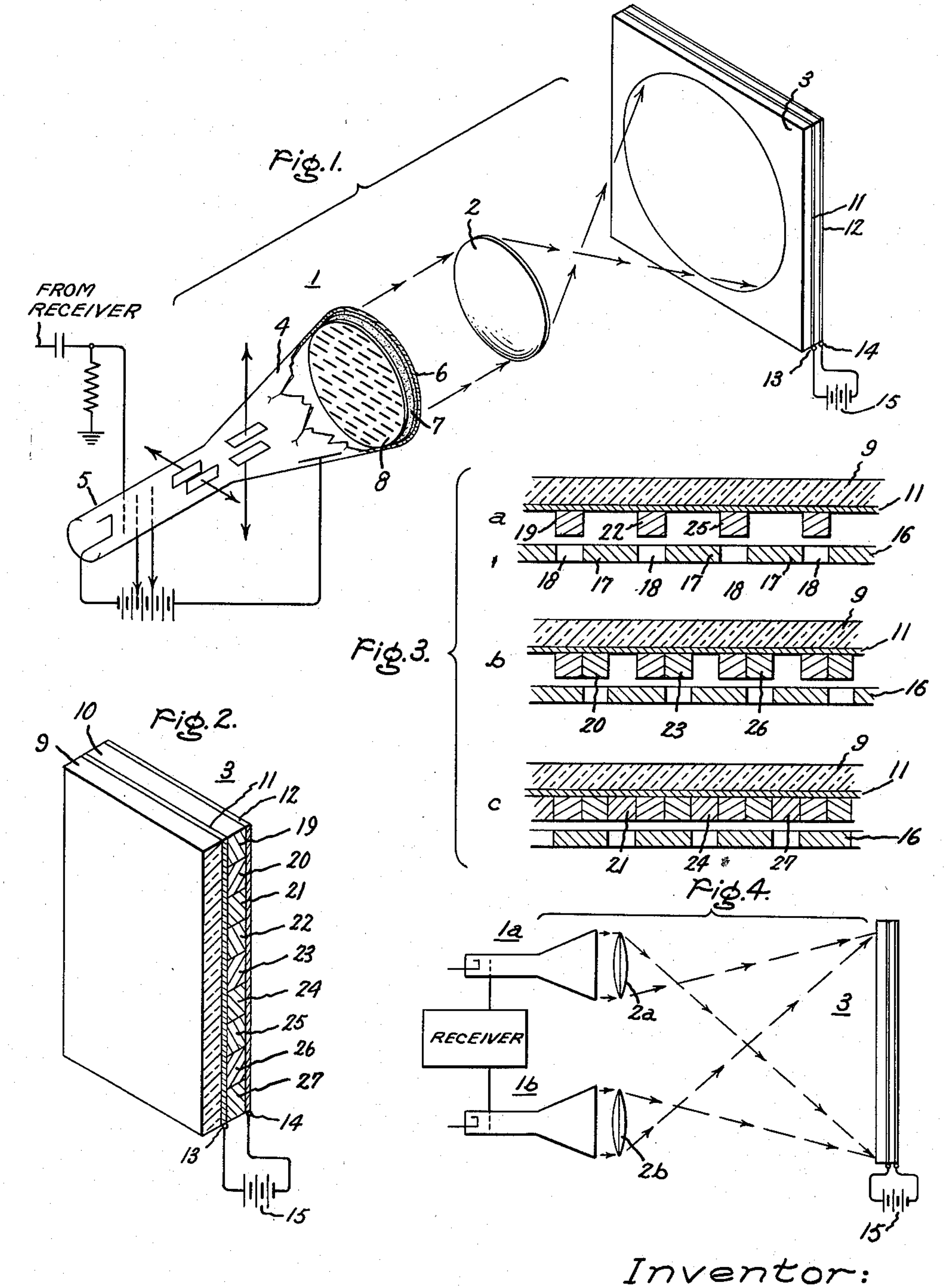

The present invention relates to projection color television. More particularly, the invention relates to projection color television systems and screens therefor adapted for the production of large, high-brightness, high-contrast color television images.

One great disadvantage of present day color television systems is that such systems are, as yet, incapable of producing large clearly defined images. Presently available color television screens are limited by the size of the projection face of color television picture tubes. These tubes presently are not even as large as monochrome television image tubes which, in turn, are much smaller than desirable. One reason why presently available color television pictures are of small size is that it is virtually impossible to increase the size of the television picture without correspondingly reducing brightness and contrast.

Accordingly, one object of the invention is to provide a color television presentation system for the production of color images having high brightness and good contrast.

A further object of the invention is to provide an improved color television projection screen.

A further object of the invention is to provide projection television screens utilizing photoelectroluminescent phosphors.

Briefly stated, in accord with one embodiment of my invention, I provide a projection color television system including a cathode ray tube which portrays a television image upon the face plate thereof in ultra-violet light having a plurality of distinct wavelength bands. The ultra-violet emission of this cathode ray tube is enlarged in size by a suitable lens system and projected upon a projection screen comprising alternate discrete regions of at least two different photoelectroluminescent phosphors, each of which is sensitive to a different wavelength of ultra-violet light and, when stimulated thereby, emits light of a different color. Since the intensity of the ultra-violet image as projected upon the projection screen is of low brightness, a unidirectional electric potential is applied to the photoelectroluminescent phosphor screen, resulting in the production of a high brightness visible-color image.

The novel features believed characteristic of the invention are set forth in the appended claims. The invention itself, together with further objects and advantages thereof, may best be understood with reference to the following description, taken in connection with the attached drawing in which:

Figure 1 is a schematic diagram of a color television presentation system constructed in accord with the invention, Figure 2 is a sectional perspective view of the projection screen utilized in the system of Figure 1, Figure 3 illustrates successive steps in the formation of the screen of Figure 2, and Figure 4 is an alternative embodiment of the system of Figure 1.

In Figure 1 a television projection system constructed in accord with one embodiment of the invention is represented diagrammatically. The system of Figure 1 includes a cathode ray tube 1 for producing ultra-violet images, a lens system 2 for enlarging the ultra-violet images, and a projection screen 3 for receiving and intensifying the images and converting them into visible light. Cathode ray tube 1 includes a conical section 4 and an electron gun section 5 including therein a cathode, a control electrode, accelerating electrodes and deflecting plates or deflecting yokes. Conical section 4 contains a face plate 6, a phosphor screen 7 composed of a plurality of different wavelength ultra-violet emitting phosphors arranged in dot or line patterns, and a suitable apertured plate 8 in close juxtaposition to screen 7. An electron beam is generated within the electron gun portion of cathode ray tube 1. This beam is deflected by deflecting plates or yokes to form a raster pattern, passes through the apertures in apertured plate 8 and excites the different ultra-violet emitting phosphors of screen 7 alternately so that only one wavelength band of ultra-violet light is emitted from tube 1 at any given time. Cathode ray tube 1 may be any conventional shadow mask or reflection type color television picture tube which is modified by the substitution of different wavelength emitting ultra-violet phosphors for the conventional visible color emitting phosphors generally utilized. Such tubes are commercially available and may, for example, be any of the tubes described in the articles contained in volume 39, No. 10, Proceedings of the I.R.E., October 1951, beginning on pages 1186, 1201, and 1212, respectively. A suitable color television projection tube is also described in vol. 42, No. 10, October 1954, Proceedings of the I.R.E., page 1478.

Lens system 2 for enlarging the size of the image projected by projection tube 1 may be any conventional lens system which is transparent to ultra-violet light, many of which are well known to the art.

Projection screen 3, illustrated in greater detail in Figure 2, comprises a base member 9 having thereon a composite phosphor layer 10 disposed in spaced relation between a pair of conducting films 11 and 12. A pair of terminals, 13 and 14 are connected to conducting films 11 and 12, respectively, and a source of unidirectional potential, represented generally by battery 15, is connected between terminals 13 and 14.

Composite phosphor layer 10 comprises a plurality of stripes 16 through 24, etc., of continuous, crystalline, homogeneous vapor-deposited photoelectroluminescent phosphor materials adapted for the production of high-brightness visible color image when simultaneously excited by the ultra-violet radiation of the cathode ray tube 1 and a unidirectional electric field. Photoelectroluminescent phosphors are those phosphors chemically produced by a vapor reaction process which exhibit the property of photoelectroluminescent wavelength conversion and photon multiplication. These phosphors are continuous, homogeneous crystalline phosphors as opposed to the conventional suspended powder in dielectric and liquid settled phosphors or pressed microcrystalline phosphors. When simultaneously irradiated by information-containing ultra-violet light and excited by a unidirectional electric field, these phosphors convert the stimulating radiation into visible light the color of which is dependent upon the particular phosphor utilized. At the same time, these phosphors increase the brightness of the image applied thereto by photon multiplication. The phenomenon of photoelectroluminescence and the characteristics of certain photoelectroluminescent phosphors are described in detail in my copending application S.N. 451,355, filed August 23, 1954, now abandoned, and assigned to the assignee of the present application.

If the system utilizes a two-component color presentation, stripes 19, 21, 23, 25, and 27 are of the same material and emit a first color when excited, and stripes 20, 22, 24 and 26 are of a second material and emit a second color when excited. If the system utilizes a three-component color presentation, stripes 19, 22, and 25 are of the same material and emit a first color when excited, stripes 20, 23 and 26 are of a second material and emit a second color when excited and stripes 21, 24 and 27 are of a third material and emit a third color when excited. If a two-component color presentation system is utilized, two different ultra-violet emitting phosphors, only, are utilized on phosphor screen 7 of cathode ray tube 1. If, on the other hand, a three-component color presentation system is utilized, phosphor screen 7 of cathode ray tube 1 comprises three different ultra-violet emitting phosphors. The number of horizontal stripes comprising screen 3 is not critical. However, for proper resolution the screen should have at least 525 stripes of each phosphor present. For screens larger than 24" in height, however, screen 3 should have approximately at least 20 stripes of each phosphor per inch, if ideal resolution and definition are to be obtained.

The stripes of phosphor screen 10 may be produced in accord with the vapor reaction process described and claimed in Patent No. 2,685,530 to Cusano and Studer, and assigned to the assignee of the present invention. In accord with this method vapors of the phosphor cation and a suitable activator are intermixed and reacted with a gas containing the phosphor anion in an evacuable reaction chamber in the vicinity of a heated substrate, resulting in the chemical deposition of the activated phosphor material in a clear crystalline homogeneous non-particulate layer upon the substrate.

Conducting layer 11 of projection screen 3 which is juxtaposed between cathode ray tube 1 and phosphor layer 10 of projection screen 3 must be transparent to ultra-violet radiation. Additionally, if the image displayed upon screen 3 is to be viewed from the same side from which it is projected, layer 11 must also be transparent to visible light. Conducting layer 12 need not be transparent to ultra-violet light. If the images projected upon screen 3 are to be viewed from the side thereof opposite to the side from which the images are projected, conducting layer 12 must be transparent to visible light. If, on the other hand, the screen is to be viewed from the side upon which images are projected, layer 12 need not be transparent to visible light. Layer 11 may conveniently comprise a thin layer of titanium dioxide deposited in accord with the teachings of U.S. Patent No. 2,732,313 to Cusano and Studer, and assigned to the assignee of the present invention. In accord with the teachings of this patent, a thin film of titanium dioxide, which may be any thickness of from 0.1 micron to 10 microns, but which is preferably several tenths microns thick, may be formed upon a suitable substrate by causing titanium tetrachloride and water vapor to be intermixed in the vicinity of the heated substrate. As deposited, the titanium dioxide film is not conducting, but may be rendered conducting by the subsequent deposition of a sulfide phosphor film thereupon. Alternatively, the titanium dioxide layer may be rendered conducting by the process described and claimed in Patent No. 2,717,844 to L. R. Koller, and assigned to the assignee of the present invention.

If conducting film 12 is to be transparent, it may conveniently be composed of titanium dioxide, and may be deposited in accord with the method described with respect to film 11. If, on the other hand, conducting film 12 need not be transparent, it may conveniently comprise an evaporated, sputtered, or otherwise deposited thin metallic film of a highly conductive material such as aluminum or silver.

Base plate 9 may be any suitable vitreous substrate which is substantially transparent to ultra-violet radiation and which has a sufficiently smooth surface for the deposition of the constituent layers of the screen thereupon. Conveniently plate 9 may be of quartz, Vycor, or Pyrex glass.

Composite phosphor layer 10 may be formed in a number of ways. One method for the formation of a composite plural-striped phosphor layer 10 utilizing three different component phosphors is schematically illustrated in Figure 3. In Figure 3*a*, a suitable substrate 9, which may conveniently be Pyrex glass has deposited thereupon a thin conducting film 11 several tenths microns thick, of a conductive material which may conveniently be titanium dioxide. An apertured mask 16 is clamped or otherwise temporarily fastened very close to, but spaced from, the surface of film 11. Apertured mask 16 has a grid-like structure and comprises a smooth surface with a plurality of parallel striped apertures 18 therein, separated by mask segments 17. Apertures 18 are each equal in width to the desired width of the individual stripes of phosphor 19 to 27 of phosphor layer 10. Mask segments 17 are each equal in width to the width of two of these adjacent phosphor stripes. Substrate 9 and mask 16 are placed within a reaction chamber and the process of Cusano and Studer Patent No. 2,685,530 is carried out resulting in the formation of stripes 19, 22 and 25 of the same phosphor material which are thin, transparent, crystalline, homogeneous and non-particulate.

Substrate 9 and apertured mask 16 are then removed from the reaction chamber and mask 16 is indexed over one phosphor stripe width and once again secured to substrate 9 as is indicated in Figure 3*b*. The vapor reaction process is again repeated, resulting in the deposition upon conducting film 12 of stripes 20, 23, and 26 of a second transparent continuous homogeneous crystalline phosphor material. The assembly is then removed from the reaction chamber and mask 16 is again indexed over the width of one phosphor stripe and is again secured to substrate 9. The assembly is then returned to the reaction chamber and the process is again carried out resulting in the formation of phosphor stripes 21, 24 and 27 upon conducting film 12. The assembly is then removed from the reaction chamber and apertured mask 16 removed from plate 9. The composite phosphor layer is then properly polished to remove any overlapping of the individual stripes, and a conducting film 12 is deposited thereupon as for example by evaporating a thin film of silver or aluminum thereupon. Terminals 13 and 14 are then made to conducting films 11 and 12, and the projection screen is completed.

In one preferred embodiment of the invention, screen 3 is viewed from the same side from which images are projected thereupon. Base 9 comprises a plate of Vycor glass. Layer 11 is a layer of titanium dioxide several microns thick, and layer 12 is a thin evaporated layer of silver. Battery 15 is connected as illustrated in Figure 1 with layer 12 negative with respect to layer II.

Although, in the preferred embodiment of the invention the discrete phosphor regions are laid down in parallel stripes, it will be appreciated that this configuration is not the only one which may be utilized in the production of screen 3. Thus, for example, screen 3 may comprise a plurality of discrete regions or dots of different color emitting phosphors applicable to a dot sequential presentation system. In this case, however, the discrete regions are preferably square in shape so that no electrical breakdown may occur between air filled interstices in the phosphor layer.

In general, the system of the invention operates as follows: When ultra-violet emitting screen 7 of cathode ray tube 1 is scanned by a beam of electrons containing the information to portray a color picture upon screen 3, the electron beam alternately irradiates discrete regions of different ultra-violet emitting phosphors. In this system, only one discrete region of a particular ultra-violet emitting phosphor is irradiated at a time. Thus, the face plate of tube 1 projects only one band of ultra-violet emission at any given time. In conventional projection tubes this switching is done at megacycle frequencies.

The phosphors comprising the individual stripes of layer 10 of screen 3 are chosen so that each emits a different color visible light and each is responsive to ultra-violet irradiation of a different wavelength corresponding to the emission of one of the phosphors on screen 7 of projection tube 1. Thus, for example, in a two-component color projection system, one component of screen 7 of projection tube 1 may comprise calcium phosphate activated with approximately 0.1 weight percent of cerium which, when irradiated by cathode rays, emits a narrow band of ultra-violet light peaked at 3650 A.U. The other component of the ultra-violet emitting screen may comprise self-activated zinc oxide (activated with approximately 0.01 weight percent of zinc) which emits a narrow band of ultra-violet radiation peaked at approximately 3900 A.U. Corresponding to this selection, screen 10 of projection screen 3 may comprise alternate stripes of zinc sulfide activated with 0.01 to 4.0 weight percent and preferably 2% by weight of manganese and chlorine, and zinc-cadmium sulfide (40% Cd), activated with 0.0001 to 0.01 weight percent and preferably 0.005 weight percent of cerium and chlorine. The former phosphor emits substantially orange light while the latter emits substantially blue light, this combination being suitable for a two color presentation system. The orange emitting phosphor is responsive to a narrow band of ultra-violet radiation from approximately 3400 to 3750 A.U., while the blue emitting phosphor is responsive to a narrow band of ultra-violet irradiation from 3800 to 4200 A.U.

When the calcium phosphate phosphor of projection tube 1 is irradiated by cathode rays and emits ultra-violet radiation of approximately 3650 A.U. wavelength, the stripes of manganese and chlorine activated zinc sulfide on projection screen 3 are selectively excited and emit orange light while the other phosphor is not excited and does not emit. Shortly thereafter, in a matter of microseconds, the electron beam in the projection tube irradiates a discrete region of the zinc oxide phosphor which emits ultra-violet light peaked at 3900 A.U. which, in turn, irradiates the cerium activated zinc-cadmium sulfide phosphor which then emits blue light. At this time, the orange emitting phosphor is not excited. Since however signals are switched by a conventional television receiver which applies the signals to cathode ray tube 1 at a megacycle frequency, and the recovery time of the human eye is not responsive to such short periods, the net result of the alternate excitation of the orange and blue phosphors on projection screen 3 is the production of a pleasing color image.

While the foregoing ultra-violet and visible light emitting phosphors have been given as one specific example of materials which may be chosen in utilizing the system of the invention, it is to be appreciated that other suitable phosphors may be utilized, subject to the condition that the ultra-violet phosphors possess mutually exclusive bands of ultra-violet emission, and that the chosen photoelectro-luminescent visible-light-emitting phosphors of screen 3 are responsive to different wavelength ultra-violet excitation and emit different visible light when excited. Furthermore, although in the specific example given before, a two color system has been utilized, it will be appreciated that the principles of the invention are equally applicable to a three component color system.

Since the emission of the phosphor screen of projection tube 1 is relatively weak the ultra-violet excitation of phosphor layer 10 of projection screen 3 is quite weak. However, phosphor layer 10 of screen 3 is composed of photoelectroluminescent phosphors which possess the characteristic of intensifying their emission when simultaneously irradiated by ultra-violet light and excited by an applied unidirectional electric field which is transverse to the plane of the phosphor layer. For this reason, an unvarying unidirectional potential is applied from battery 15 through terminals 13 and 14 to conducting electrodes 11 and 12. This results in the application of the unidirectional field transverse to the plane of phosphor layer 10. This field should be of the order of $10^5$ volts per centimeter and, since layer 10 is conveniently approximately 5 to 50 microns in thickness, a unidirectional potential of approximately 50 to 500 volts is sufficient to produce photoelectroluminescent emission therefrom of a much greater intensity than the ultra-violet radiation incident thereupon. In the operation of the projection screen of the invention the ultra-violet irradiation thereof need contain only sufficient energy to convey information to the screen. The energy required to produce a high-brightness color image is derived from voltage source 15 rather than from the incident radiation. This mode of operation is the greatest distinction from and the greatest advantage over information portraying screens of the prior art. In prior art information portraying screens the incident radiation, in addition to containing picture information, must also contain sufficient energy to excite the screen to high brightness luminescence. This generally requires prior art information portraying screens to be operated in an evacuated enclosure and to be bombarded with electron beams with many thousand volts potential. Since the portrayal screen of the invention is responsive to weak ultra-violet rays it need not be operated in a vacuum, and may be much larger in area than the face plate of the protection tube utilized.

The projection screen of the invention thus comprises a luminescent screen made up of a plurality of parallel stripes of at least two different visible light, color-emitting photoelectroluminescent phosphors, each of these phosphors being sensitive to irradiation by a different wavelength band ultra-violet light. The composite phosphor layer is juxtaposed in spaced relation between conducting electrodes, at least one of which is transparent, which serve to apply a unidirectional electrical potential across the phosphor layer. When this screen is irradiated with ultra-violet light containing color information signals, the signals being alternately switched from one wavelength frequency to another by a television projection tube which emits at least two different wavelength bands of ultra-violet light, the screen under the joint stimulus of the ultra-violet light and the unidirectional electric field produces high brightness visible color images.

In Figure 4 of the drawing there is illustrated an alternative embodiment of the system illustrated in Figure 1. In Figure 4, ultra-violet projection cathode ray tube 1 is replaced by at least two ultra-violet emitting cathode ray tubes **1*a* and 1*b*, each of which possesses a phosphor screen comprising only one ultra-violet emitting phosphor, the emission spectra of which are selected to be coincident with the excitation stimulus wavelength of the components of the projection screen 3. Each tube is connected separately to a conventional television receiver which alternately and sequentially supplies color signals to each of the projection tubes. Switching from one color signal to another is thus accomplished by the television receiver rather than by the projection tube. Lens systems 2*a* and 2*b* are similar to lens system 2** of Figure 1, and need only be sufficient to focus and enlarge the image projected by the television projection tubes, and be transparent to ultra-violet light.

While the invention has been set forth hereinbefore with respect to certain embodiments thereof it is apparent that many changes and modifications will immediately occur to those skilled in the art. Accordingly, I intend, by the appended claims to cover all such changes and modifications as fall within the true spirit and scope of the foregoing disclosure.

What I claim as new and desire to secure by Letters Patent of the United States is:

1. In a projection color television system comprising projection means providing an information-containing ultra-violet image which alternates sequentially through a plurality of different ultra-violet wavelength bands, and lens means juxtaposed with said projection means for enlarging and focusing said ultra-violet image, an image conversion and intensifying screen for converting said ultra-violet image into a high brightness visible image and comprising a separate and discrete phosphor layer having a plurality of phosphor elements each of which is responsive to a different one of said different ultra-violet bands and emits a different color visible light, a pair of conducting electrodes each in contact with substantially all of one of the opposite surfaces of said phosphor layer, and means applying a unidirectional electrical voltage between said electrodes.

2. In a projection color television system comprising projection means providing an information-containing ultra-violet image which alternates sequentially through a plurality of different ultra-violet wavelength bands, and lens means juxtaposed with said projection means for enlarging and focusing said ultra-violet image, a wavelength conversion and intensifying screen for converting said ultra-violet image into a high brightness visible image and comprising a phosphor layer including alternate discrete regions of a plurality of photoelectroluminescent phosphors each of which is responsive to a different one of said ultra-violet wavelength bands and which when excited thereby emits a different color visible light, a pair of conducting electrodes each in contact with substantially all of one of the opposite surface of said phosphor layer, and means applying a unidirectional electrical voltage between said conducting electrodes.

3. A color image conversion and intensifying screen comprising a composite phosphor layer including alternate regions of a plurality of photoelectroluminescent phosphors each of which is responsive to a different wavelength of ultra-violet light and when excited thereby emits a different color visible light, a transparent conducting film of titanium dioxide overlying substantially all of one surface of said layer, a thin conducting metallic film overlying substantially all of the opposite surface of said layer, and means applying a unidirectional voltage potential between said conducting films.

4. A color image conversion and intensifying screen comprising a composite phosphor layer including alternate discrete regions of a plurality of photoelectroluminescent phosphors each of which is responsive to a different wavelength band of ultra-violet light and when excited thereby emits a different color visible light, a pair of conducting electrodes each in contact with substantially all of one of the opposite surfaces of said phosphor layer and means applying a unidirectional electrical voltage between said conducting electrodes.

5. A color image conversion and intensifying screen comprising a transparent vitreous base plate, a thin transparent conducting film of titanium dioxide overlying said base plate, a composite phosphor layer overlying said transparent conducting film, said layer comprising alternate stripes of a plurality of photoelectroluminescent phosphors each of which is responsive to a different wavelength band of ultra-violet light and when excited thereby emits a different color visible light, a thin conducting metallic film overlying substantially all of the exposed surface of said phosphor layer, and means applying a unidirectional electrical potential between said conducting electrodes.

6. A screen responsive to incident ultra-violet energy for producing a colored image of greater intensity than the incident ultra-violet energy, said screen comprising a base plate, a first conducting film overlying said base plate on one side thereof, a composite phosphor layer overlying said first conducting film, said layer comprising alternate stripes of photoelectroluminescent phosphors some of which are responsive to different wavelength bands of ultra-violet energy and when excited thereby emit different color visible light, a second conducting film overlying substantially all of the exposed surface of said phosphor layer, and means for applying a unidirectional electrical potential between said conducting films.

7. The screen as defined in claim 6 wherein said base plate and first conducting film are transparent to ultra-violet energy and said second conducting film is transparent to visible light.

8. The screen as defined in claim 6 wherein said base plate and first conducting film are transparent to visible light and ultra-violet energy.

9. The screen as defined in claim 6 wherein said second conducting film is transparent to visible light and ultra-violet energy.

10. The screen as defined in claim 6 wherein said base plate and first conducting film are transparent to visible light and said second conducting film is transparent to ultra-violet energy.

References Cited in the file of this patent

UNITED STATES PATENTS

| | | |
|---|---|---|
| 2,553,182 | Cage | May 15, 1951 |
| 2,728,815 | Falfaian | Dec. 27, 1955 |
| 2,778,871 | Muller | Jan. 22, 1957 |
| 2,795,730 | Fromm et al. | June 11, 1957 |
| 2,837,676 | Michlin | June 3, 1958 |
| 2,861,206 | Fiore et al. | Nov. 18, 1958 |

UNITED STATES PATENT OFFICE
CERTIFICATE OF CORRECTION

Patent No. 2,957,940 October 25, 1960

Dominic A. Cusano

It is hereby certified that error appears in the above numbered patent requiring correction and that the said Letters Patent should read as corrected below.

Column 7, line 11, strike out "separate and discrete" and insert the same after "of", first occurrence, in line 12, same column 7.

Signed and sealed this 3rd day of July 1962.

(SEAL)
Attest:

ERNEST W. SWIDER
Attesting Officer

DAVID L. LADD
Commissioner of Patents